United States Patent
Gupta et al.

(10) Patent No.: US 7,299,110 B2
(45) Date of Patent: Nov. 20, 2007

(54) SYSTEMS AND METHODS FOR USING STATISTICAL TECHNIQUES TO REASON WITH NOISY DATA

(75) Inventors: Rakesh Gupta, Cupertino, CA (US); Mykel J. Kochenderfer, Edinburgh (GB)

(73) Assignee: Honda Motor Co., Ltd. (JP)

( * ) Notice: Subject to any disclaimer, the term of this patent is extended or adjusted under 35 U.S.C. 154(b) by 69 days.

(21) Appl. No.: 10/752,880

(22) Filed: Jan. 6, 2004

(65) Prior Publication Data

US 2005/0149230 A1 Jul. 7, 2005

(51) Int. Cl.
*G05B 19/04* (2006.01)

(52) U.S. Cl. ............... 700/246; 700/18; 700/83; 700/86; 700/87; 704/1; 704/10; 704/257; 706/45; 707/102

(58) Field of Classification Search ............... 700/246
See application file for complete search history.

(56) References Cited

U.S. PATENT DOCUMENTS

| | | | |
|---|---|---|---|
| 4,839,853 A | 6/1989 | Deerwester et al. | |
| 5,442,792 A | 8/1995 | Chun | |
| 6,088,731 A * | 7/2000 | Kiraly et al. | 709/229 |
| 6,292,771 B1 | 9/2001 | Haug et al. | |
| 6,466,695 B1 | 10/2002 | Potzsch et al. | |
| 6,625,315 B2 | 9/2003 | Laumeyer et al. | |
| 6,757,646 B2 * | 6/2004 | Marchisio | 704/8 |
| 6,850,252 B1 * | 2/2005 | Hoffberg | 715/716 |
| 7,089,226 B1 * | 8/2006 | Dumais et al. | 707/3 |
| 2002/0077726 A1 * | 6/2002 | Thorisson | 700/246 |
| 2003/0004915 A1 | 1/2003 | Lin et al. | |
| 2003/0217052 A1 | 11/2003 | Rubenczyk et al. | |
| 2005/0021517 A1 * | 1/2005 | Marchisio | 707/4 |

FOREIGN PATENT DOCUMENTS

| | | |
|---|---|---|
| EP | 1 284 461 A1 | 2/2003 |
| EP | 1 363 200 A2 | 11/2003 |

OTHER PUBLICATIONS

Thrum et al., Probabilistic algorithms and the interactive museum tour-guide robot Minerva, 2000, Internet, p. 35.*
Snyder et al., Intelligen simulation environments, 1988, Internet, p. 357-363.*
Itoh, Research and development on knowledge base systems at ICOT, 1986, Internet, p. 437-445.*

(Continued)

*Primary Examiner*—Thomas Black
*Assistant Examiner*—McDieunel Marc
(74) *Attorney, Agent, or Firm*—Mark E. Duell; Fenwick & West LLP

(57) ABSTRACT

Systems and methods are presented that enable logical reasoning even in the presence of noisy (inconsistent) data. The knowledge base is processed in order to make it consistent and is also compiled. This processing includes checking and correcting spelling, removing stopwords, performing, grouping words of similar and related meaning, and compacting the knowledge base. A robot can use the processed knowledge base to perform many different types of tasks, such as answering a query, determining a course of action that is designed to achieve a particular goal, and determining its own location.

33 Claims, 5 Drawing Sheets

OTHER PUBLICATIONS

Rumshisky, Why your word processing software doesn't fing spelling and grammar errors very well . . . And never will, 2001, Internet, p. 1-5.*

Jarzabek et al., A hybrid program knowledge base for static program analyzers, 1994, IEEE, p. 400-409.*

Darbari, Computer assisted translation system—An indian prespective, 1999, Internet, p. 80-85.*

Benferhat, Salem, et al., "How to Infer From Inconsistent Beliefs Without Revising?", Proceedings of the International Joint Conference on Artificial Intelligence (IJCAI), Montreal, Canada, Aug. 20-25, 1995, pp. 1449-1455.

Verma, Deepak, et al., "A Comparison of Spectral Clustering Algorithms", University of Washington Computer Science & Engineering, Technical Report, pp. 1-18, Mar. 5, 2001.

Dalal, Mukesh, "Investigations Into a Theory of Knowledge Base Revision: Preliminary Report" Proceedings of the Seventh National Conference on Artificial Intelligence (AAAI), Aug. 1988, St. Paul, Minnesota, pp. 475-479.

Del Val, Alvaro, "Research in Automated Reasoning", Universidad Autonoma de Madrid, First Technical Workshop of the Computer Engineering Dept., Mar. 31, 2000.

Haddawy, Peter, "An Overview of Some Recent Developments in Bayesian Problem Solving Techniques", AI Magazine, Introduction to special issue on Uncertainty in AI, Spring 1999.

Nebel, Bernhard, "How Hard is it to Revise a Belief Base?", Technical Report No. 83, Institut fur Informatik, Albert-Ludwigs-Universitat Freiburg, Aug. 1996, Published in the Handbook of Defeasible Reasoning and Uncertainty Management Systems, vol. 3: Belief Change.

Manning, Chris, et al., "Foundations of Statistical Natural Language Processing", MIT Press, Cambridge, MA, May 1999, pp. 554-566.

Kochenderfer, Mykel J., et al., "Common Sense Data Acquisition for Indoor Mobile Robots", Workshop on Distributed and Collaborative Knowledge Capture, Second International Conference on Knowledge Capture (K-CAP), Florida, USA, Oct. 23-26, 2003.

Landauer, Thomas K., et al., "An Introduction to Latent Semantic Analysis", Discourse Processes 25, 1998, pp. 259-284.

Deerwester, Scott, et al., "Indexing by Latent Semantic Analysis", Journal of the American Society for Information Science (JASIS), 41:6, Sep. 1990, pp. 391-407.

Cadoli, Marco, et al., "A Survey on Knowledge Compilation", AI Communications, 10:137-150, 1997.

Baeza-Yates, Ricardo et al., *Modem Information Retrieval*, 1999, pp. 163-190, ACM Press, New York.

Bratman, Michael, *Intention, Plans, and Practical Reason*, 1987, pp. 1-27, Harvard University Press, Cambridge, Massachusetts.

Mueller, Erik T., *Natural Language Processing With Thought-Treasure*, 1998, Signiform, New York, [online] [retrieved on Oct. 20, 2004] Retrieved from the internet <URL: http://www.signiform.com/tt/book/index.html>.

Gupta, R. et al., "Common Sense Data Acquisition for Indoor Mobile Robots," Proceedings of the Nineteenth National Conference on Artificial Intelligence (AAAI), Jul. 25-29, 2004, pp. 605-610.

Eagle, N., et al., "Common Sense Conversations: Understanding Casual Conversation Using A Common Sense Database," 18th International Joint Conference on Artificial Intelligence (IJCAI), Workshop on Artificial Intelligence, Information Access, and Mobile Computing, Aug. 11, 2003.

Guha, R. et al., "Cyc: A Midterm Report", AI Magazine, Fall 1990, pp. 32-59.

Liu, H. et al., "A Model of Textual Affect Sensing Using Real-World Knowledge," In Proceedings of the Seventh International Conference on Intelligent User Interfaces (IUI), Jan. 12-15, 2003, pp. 125-132.

Luhn, H. P., "The Automatic Derivation of Information Retrieval Encodements from Machine-Readable Texts," Information Retrieval and Machine Translation 3(2), 1961, pp. 1021-1028.

Nilsson, N. J., "Teleo-Reactive Programs for Agent Control," Journal of Artificial Intelligence Research 1, 1994, pp. 139-158.

Rao, A.S. et al., "BDI Agents: From Theory to Practice," In Proceedings of the First International Conference on Multi-Agent Systems, Jun. 1995.

Scott, S. et al., "Feature Engineering for Text Classification," Proceedings of the 16th International Conference on Machine Learning (ICML), Jun. 27-30, 1999, Slovenia: Morgan Kaufmann Publishers, San Francisco, USA, pp. 379-388.

Stork, D.G., et al., "The Open Mind Initiative," IEEE Intelligent Systems and Their Applications 14(3), May/Jun. 1999, pp. 19-20.

Stork, D.G., "Open Data Collection for Training Intelligent Software in the Open Mind Initiative," Proceedings of the Engineering Intelligent Systems Symposium (EIS), Jun. 2000.

Voorhees, E.M., "Query Expansion Using Lexical-Semantic Relations" Proceedings of the 17th International Conference on Research and Development in Information Retrieval (SIGIR), 1994; pp. 61-69.

Wooldridge, M., "Intelligent Agents", In Weiss, G., ed., Multiagent Systems: A Modern Approach to Distributed Artificial Intelligence. The MIT Press, Cambridge, MA, 1999, pp. 27-77.

PCT International Search Report and Written Opinion; PCT/US05/00299, Nov. 3, 2005.

Fagin, R. et al., "On the Semantics of Updates in Databases", Principles of Database Systems: Proceedings of the Second ACM SIGACT-SIGMOD Symposium, Atlanta, GA, Ed. Jeffrey Ullman, 1983, pp. 352-365.

Gardenfors, P., "Knowledge in Flux—Modeling the Dynamic of Epistemic States" (table of contents), 1988, MIT Press, Cambridge, MA.

Jolliffe, I.T., "Principle Component Analysis" (table of contents), 1986, Springer-Verlag, New York, NY.

Kannan, R. et al., "On Clusterings—Good, Bad and Spectral", 41st Annual Symposium on Foundations of Computer Science, Nov. 12-14, 2000, Redondo Beach, CA.

Manning, C.D. et al., "Chapter 15: Topics in Information Retrieval: Latent Semantic Indexing", Foundations of Statistical Natural Language Processing, 1999, pp. 554-566, MIT Press, Cambridge, MA.

Myers, K. et al., "Reasoning with Analogical Representations", Principles of Knowledge Representation and Reasoning: Proceedings of the Third International Conference (KR '92), Ed. B. Nebel et al., 1992, pp. 189-200, Morgan Kaufmann Publishers, San Mateo, CA.

Bellegarda, J. R., "Exploiting Latent Semantic Information in Statistical Language Modeling," Proceedings of the IEEE, Aug. 2000, vol. 88, No. 8, pp. 1279-1296.

Harabagiu, S. M., et al., "PARIS: A Parallel Inference System," IEEE, Nov. 16, 1996, pp. 216-223.

Pan, X., et al., "Providing Context for Free Text Interpretation," Proceedings: International Conference on Natural Language Processing and Knowledge Engineering, Oct. 26-29, 2003, Piscataway, NJ, pp. 704-709.

Tsuji, T., et al., "The Construction of Knowledge Bases with Morphological Semantics," IEEE International Conference on Systems, Man and Cybernetics, Beijing, China, Oct. 14-17, 1996, pp. 31-36, vol. 1.

* cited by examiner

SYSTEMS AND METHODS FOR USING STATISTICAL TECHNIQUES TO REASON WITH NOISY DATA

BACKGROUND OF THE INVENTION

1. Field of the Invention

The present invention relates to automated reasoning. More particularly, the present invention relates to using statistical techniques in order to enable automated reasoning with noisy data.

2. Description of Background Art

Robots will soon be expected to accomplish tasks within their environments and to satisfy the perceived requests and desires of their users. Determining these desires and reasoning about how they can be accomplished requires common sense. One of the main challenges in the field of robotics is making robots more intelligent by endowing them with common sense. In order for robots to have common sense, they need some amount of general knowledge to use as a basis. They can then reason from this basis to accomplish their tasks and interact with their world intelligently.

Automated reasoning, a topic within the field of artificial intelligence, is concerned with using computers to perform logical reasoning. Logical reasoning, such as deduction, consists of drawing conclusions from facts. Conclusions are formed by applying rules (e.g., implications) to facts. This is also known as inferencing. Logical reasoning systems comprise implications, a basis of facts, and control mechanisms for applying implications to these facts. In automated reasoning systems, facts and implications are stored in a "knowledge base." Facts are established by, for example, user input (e.g., by typing in "The stove is hot") or sensor input (e.g., by placing a heat sensor near the stove). Implications are established by, for example, user input (e.g., by typing in "An item in a refrigerator is cold") or machine learning.

For logical reasoning to be sound, an implication must require that its conclusion follow inevitably from the fact from which it is drawn. Depending on the facts and implications that a system starts with, many different conclusions can be reached. In addition, implications can be applied to both facts (originally input into the system) and conclusions (generated by implications). Because of the interactions between facts, implications, and conclusions, it is important that the initially-input facts and implications be correct. If the facts or implications are false or inconsistent with one another, the resulting conclusions may be invalid.

Thus, automated reasoning systems must have self-consistent knowledge bases. Any sound and complete consistency check will require an exponential amount of time based on the number of items in the database. Consistency checks need to be performed each time something is added the knowledge base. The result is that automated reasoning systems are very brittle. Their knowledge bases are frequently handcrafted, and differences in vocabulary are usually not tolerated.

One way to reason with inconsistent knowledge is to revise the knowledge base before performing the reasoning. Any revision process requires, either explicitly or implicitly, the ordering of rules based on priority. This has been proved by "On the semantics of updates in database" by R. Fagin, J. D. Ullman, M. Y. Vardi, in Principles of Database Systems: Proceedings of the Second ACM SIGACT-SIGMOD Symposium, pp. 352-365, Atlanta, 1983; and "Knowledge in Flux—Modeling the Dynamic of Epistemic States" by P. Gardenfors, Cambridge, Mass., 1988. Alternatively, one can reason with inconsistent knowledge without first revising the knowledge base, as discussed in "How to infer from inconsistent beliefs without revising?" by S. Benferhat, D. Dubois, and H. Prade, Proceedings of the Fourteenth International Joint Conference on Artificial Intelligence, Montreal, Canada, Aug. 20-25, 1995. In general, prior work in this area has been based on logical artificial intelligence techniques rather than on statistical techniques.

Before inferencing from a knowledge base, it is also useful to "compile" the knowledge base. Compilation of a knowledge base can comprise cleaning, generalizing, and compacting the data in the knowledge base. Compilation can decrease the amount of resources (time, memory, etc.) required by the reasoning process.

What is needed is a way to enable automated reasoning systems to use noisy data, that is, knowledge bases that are not self-consistent. In addition, automated reasoning systems should be able to handle tasks that contain words that are not in the knowledge base.

SUMMARY OF THE INVENTION

One of the main challenges in the field of robotics is making robots more intelligent by endowing them with common sense. This common sense can then be used to perform logical reasoning. Common sense is stored in a knowledge base as a set of statements and implications. It is important that the statements and implications be consistent with one another; if they are not, the resulting conclusions may be invalid.

Systems and methods are presented that enable logical reasoning even in the presence of noisy (inconsistent) data. The knowledge base is processed in order to make it consistent and also compiled. This processing includes checking and correcting spelling, removing stopwords, performing stemming, grouping words of similar and related meaning, and compacting the knowledge base.

A robot can use the processed knowledge base to perform many different types of tasks in many different environments. In one embodiment, the robot is a mobile robot used in a home or office environment. Possible tasks include, for example, answering a query, determining a course of action that is designed to achieve a particular goal, and determining its own location.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION OF THE PREFERRED EMBODIMENTS

Figure 1:
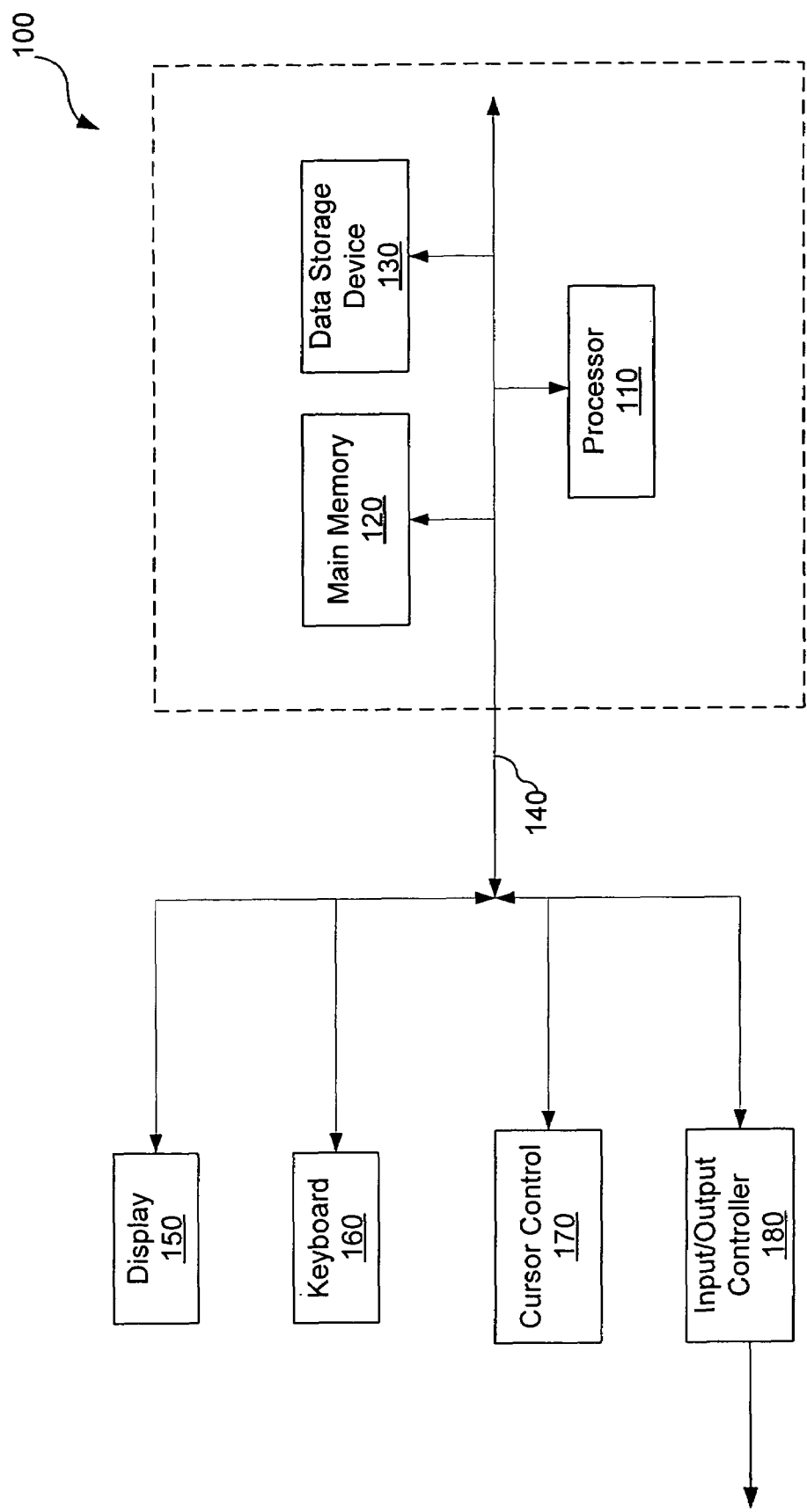
FIG. 1 illustrates a block diagram of a preferred embodiment of an apparatus for reasoning when noisy data is present.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems will appear from the description below. In addition, the present invention is not described with reference to any particular programming language. It will be appreciated that a variety of programming languages may be used to implement the teachings of the invention as described herein.

1. Architecture of Reasoning Apparatus

FIG. 1 illustrates a block diagram of a preferred embodiment of an apparatus for reasoning when noisy data is present. Reasoning apparatus 100 preferably includes a processor 110, a main memory 120, a data storage device 130, and an input/output controller 180, all of which are communicatively coupled to a system bus 140. Reasoning apparatus 100 can be, for example, a computer or a robot.

Reasoning apparatus 100 uses statistical reasoning to enable it to reason when noisy data is present. Statistical reasoning, unlike logical reasoning, includes the notion of uncertainty. This uncertainty is expressed through the use of statistics, such as latent semantic analysis, and probability theory, such as Bayesian networks. Statistical reasoning has traditionally been used to work with large text documents in the fields of data retrieval and data mining.

By processing a knowledge base using statistical methods, reasoning apparatus 100 makes the knowledge base unambiguously reflect consensus knowledge. Reasoning apparatus 100 can then reason from the knowledge base without creating invalid results. Statistical reasoning techniques have not been used in this area in the past. One possible reason for this is that in the past, the available data has not been dense enough to leverage statistical techniques.

Reasoning apparatus 100 also uses statistical methods to process queries and commands. This results in reasoning apparatus 100 being able to handle tasks that contain words that are not in the knowledge base.

Processor 110 processes data signals and comprises various computing architectures including a complex instruction set computer (CISC) architecture, a reduced instruction set computer (RISC) architecture, or an architecture implementing a combination of instruction sets. Although only a single processor is shown in FIG. 1, multiple processors may be included.

Main memory 120 stores instructions and/or data that are executed by processor 110. The instructions and/or data comprise code for performing any and/or all of the techniques described herein. Main memory 120 is preferably a dynamic random access memory (DRAM) device, a static random access memory (SRAM) device, or some other memory device known in the art.

Data storage device 130 stores data and instructions for processor 110 and comprises one or more devices including a hard disk drive, a floppy disk drive, a CD-ROM device, a DVD-ROM device, a DVD-RAM device, a DVD-RW device, a flash memory device, or some other mass storage device known in the art.

Network controller 180 links reasoning apparatus 100 to other devices so that reasoning apparatus 100 can communicate with these devices.

System bus 140 represents a shared bus for communicating information and data throughout reasoning apparatus 100. System bus 140 represents one or more buses including an industry standard architecture (ISA) bus, a peripheral component interconnect (PCI) bus, a universal serial bus (USB), or some other bus known in the art to provide similar functionality.

Additional components that may be coupled to reasoning apparatus 100 through system bus 140 include a display device 150, a keyboard 160, and a cursor control device 170. Display device 150 represents any device equipped to display electronic images and data to a local user or maintainer. Display device 150 is a cathode ray tube (CRT), a liquid crystal display (LCD), or any other similarly equipped display device, screen, or monitor. Keyboard 160 represents an alphanumeric input device coupled to reasoning apparatus 100 to communicate information and command selections to processor 110. Cursor control device 170 represents a user input device equipped to communicate positional data as well as command selections to processor 110. Cursor control device 170 includes a mouse, a trackball, a stylus, a pen, cursor direction keys, or other mechanisms to cause movement of a cursor.

It should be apparent to one skilled in the art that reasoning apparatus 100 includes more or fewer components than those shown in FIG. 1 without departing from the spirit and scope of the present invention. For example, reasoning apparatus 100 may include additional memory, such as, for example, a first or second level cache or one or more application specific integrated circuits (ASICs). As noted above, reasoning apparatus 100 may be comprised solely of ASICs. In addition, components may be coupled to reasoning apparatus 100 including, for example, image scanning devices, digital still or video cameras, or other devices that may or may not be equipped to capture and/or download electronic data to/from reasoning apparatus 100.

Figure 2:
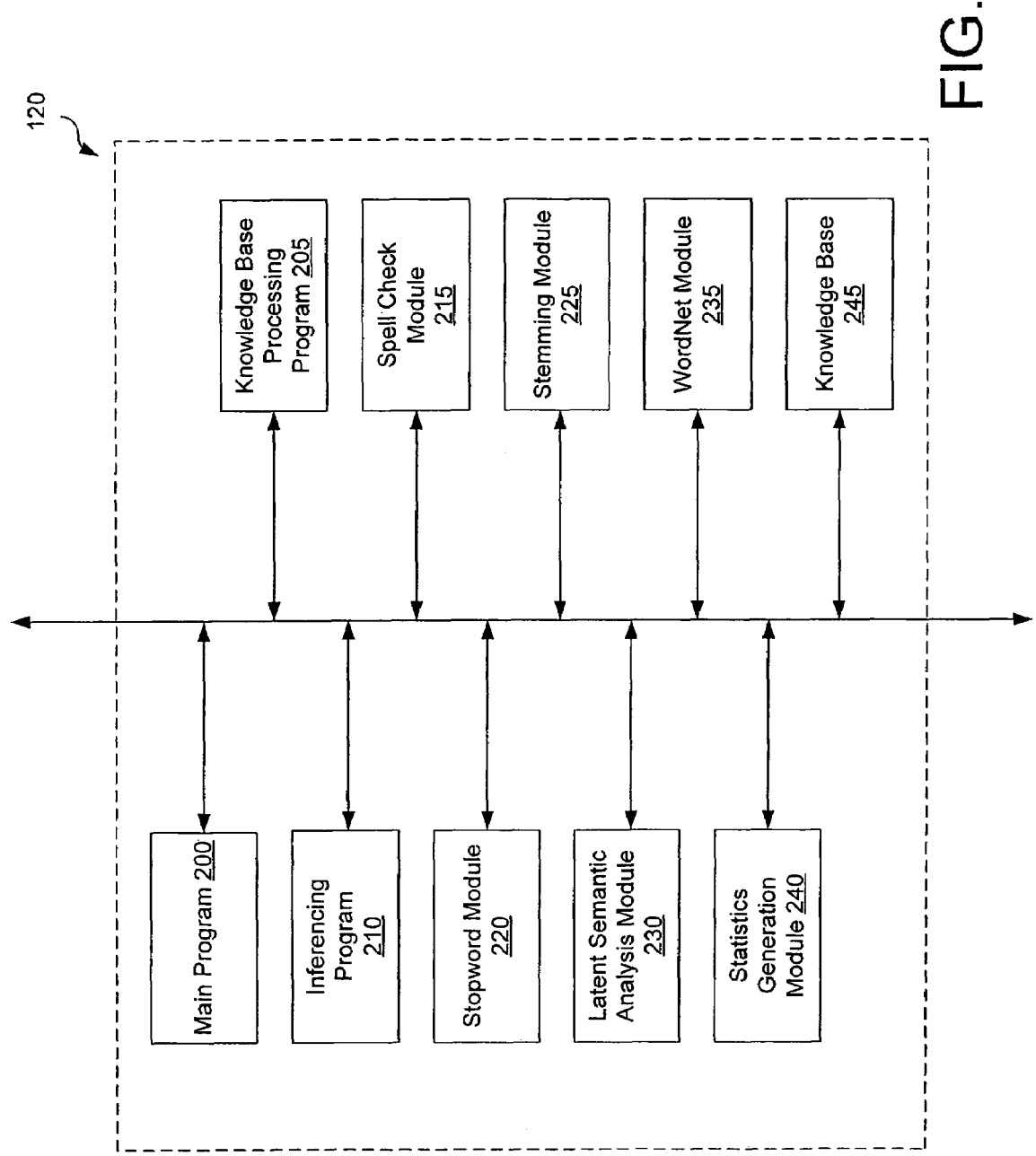
FIG. 2 illustrates a more detailed block diagram of the contents of the memory unit in FIG. 1.

FIG. 2 illustrates a more detailed block diagram of the contents of the memory unit in FIG. 1. Generally, memory unit 120 comprises several code modules for reasoning when noisy data is present. Specifically, the code modules in memory unit 120 include a main program 200, knowledge base processing program 205, inferencing program 210, spell check module 215, stopword module 220, stemming module 225, latent semantic analysis module 230, WordNet module 235, statistics generation module 240, and knowledge base 245.

All code modules 205, 210, 215, 220, 225, 230, 235, 240, 245 are communicatively coupled to main program 200. Main program 200 centrally controls the operation and process flow of reasoning apparatus 100, transmitting instructions and data to as well as receiving data from each code module 205, 210, 215, 220, 225, 230, 235, 240, 245. Details of its operation will be discussed below with reference to FIG. 3.

Knowledge base processing program 205 processes a knowledge base in order to make it self-consistent and also compiles a knowledge base. Knowledge base processing program 205 accomplishes this by using spell check module 215, stopword module 220, stemming module 225, and latent semantic analysis module 230.

Knowledge base 245 stores a knowledge base comprising facts and implications. As implications are applied to facts, the resulting conclusions are also stored in knowledge base 245.

Spell check module 215 checks and corrects the spelling of words. Stopword module 220 removes particular words from a collection of words. Stemming module 225 maps word variants to the same word. For example, "cooking", "cooked", and "cooks" would be mapped to "cook". Latent semantic analysis module 230 performs latent semantic analysis on a collection of implications to find the most relevant implications. WordNet module 235 compacts data. WordNet module 235 also enables reasoning about words that do not exist in a knowledge base. Inferencing program 210 uses facts and implications stored in a knowledge base and generates conclusions through inferencing. Statistics generation module 240 generates statistics based on data in a knowledge base. Code modules 200-245 will be further discussed below with reference to FIGS. 3 and 4.

2. Usage of Reasoning Apparatus

Figure 3:
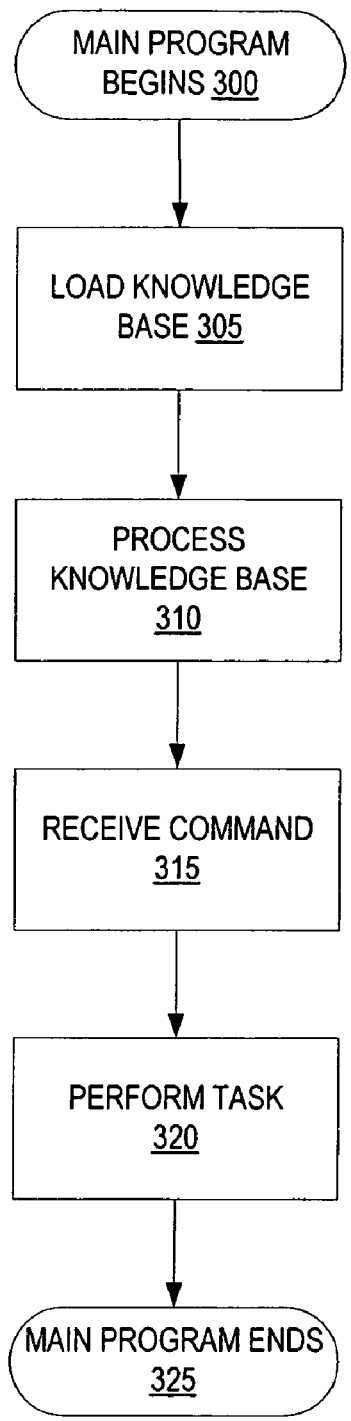
FIG. 3 illustrates a method for reasoning when noisy data is present.

As noted above, reasoning apparatus 100 can be used in many different contexts to perform many different tasks. FIG. 3 illustrates a method for reasoning when noisy data is present. In one embodiment, this reasoning is based on common sense knowledge.

In the first step, main program 200 begins 300. Main program 200 then loads 305 data into the knowledge base 245. The data consists of statements and implications. In one embodiment, the knowledge base 245 is designed to enable reasoning from common sense knowledge. In this embodiment, a statement is a relation based on a real-world object. A relation is a pair $$\phi=(o,p)$$

where o is the object and p is a property of the object (an adjective or attribute). For example, one statement is (coffee, heated). A statement can describe the current state of an object ("the coffee is heated") or it can describe the desired state of an object ("the coffee should be heated"). A statement can also represent an action ("do something to make the coffee heated").

Common sense knowledge itself is represented by implications. Implications apply to a first statement (the antecedent) and create a second statement (the consequent). In this embodiment, a "causes implication" encodes the knowledge that one statement implies (or causes) another statement. For example, (coffee, refrigerated) implies (coffee, cold). This is represented symbolically as $$\phi_1 \rightarrow \phi_2 \text{ where } \phi_1=\text{(coffee, refrigerated) and } \phi_2=\text{(coffee, cold)}$$

Causes implications can be used to predict the results of actions. The variable F denotes the set of all causes implications in the knowledge base 245.

A "desires implication" encodes the knowledge that one statement indicates a desire that another statement be true. For example, (stomach, growling) indicates (human, fed). This is represented symbolically as $$\phi_1 \rightarrow_d \phi_2 \text{ where } \phi_1=\text{(stomach, growling) and } \phi_2=\text{(human, fed)}$$

Desires implications can be used to anticipate human desires. The variable I denotes the set of all desires implications in the knowledge base 245.

The variable S denotes the set of all statements that are true in the current state of the world. The variable S* (the closure of S) is given by the recursive definition $$S^*=S\cup\{\phi:\phi'\rightarrow\phi\in F \wedge \phi'\in S^*\}$$

S* is a function of time because the states of objects can change and new knowledge can be inserted into the knowledge base 245.

In one embodiment, the data is loaded into a MySQL™ database from MySQL AB. The following table contains relations that might be used in the database.

| Type of Relation | Fields |
| --- | --- |
| Statements | id, obj, prop, desire |
| Causes | id, obj1, prop1, obj2, prop2 |
| Desires | id, obj1, prop1, obj2, prop2 |
| Objects | id, name |
| Uses | id, obj, vp |
| Rooms | id, name |
| Proximity | id, obj1, obj2 |
| Locations | id, obj, room |

The Statements, Causes, and Desires relations enable inferencing. The Objects, Uses, Rooms, Proximity, and Locations relations are used to accomplish specific tasks. These tasks include goal achievement and parameter determination and will be further discussed below.

The data might have been communicated to reasoning apparatus 100 through the input/output controller 180. Alternatively, the data might have been present in data storage device 130.

Once main program 200 has loaded 305 the data into the knowledge base 245, main program 200 processes 310 the knowledge base 245 using statistical methods. One purpose for this processing is to make the knowledge base self-consistent. One way to ensure that a knowledge base is self-consistent is to handcraft it, making sure that each piece of information is valid and checking that it does not conflict with other information in the knowledge base. Since a knowledge base needs to contain a lot of information in order to be useful, handcrafting one can take a lot of time. It would be preferable if the knowledge base could be made self-consistent without requiring a person to review each piece of information manually. Another purpose for this processing is to compile the knowledge base, generalizing and compacting it so that it requires less storage space and reasoning can be performed on it more quickly.

Figure 4:
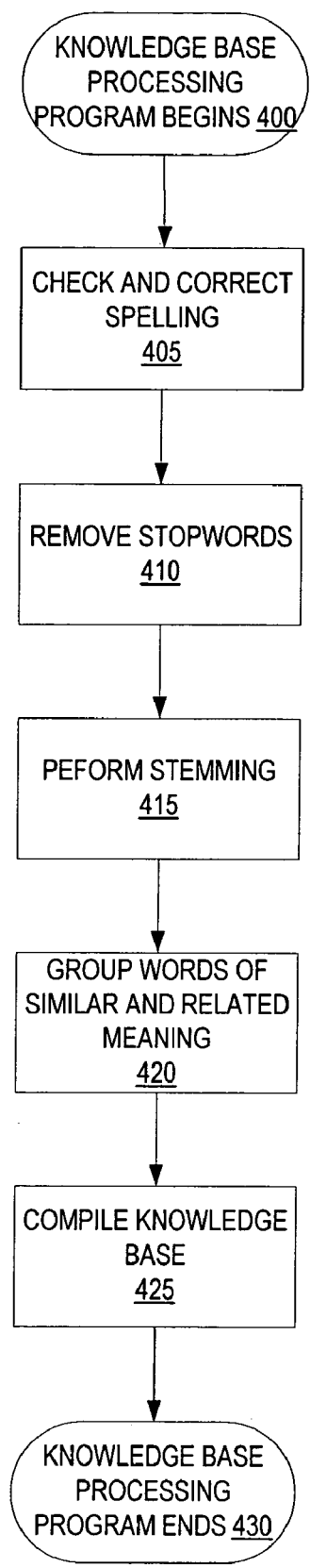
FIG. 4 illustrates a method for processing a knowledge base.

Step 310 is detailed in FIG. 4. FIG. 4 illustrates a method for processing a knowledge base. In the first step, knowledge base processing program 205 begins 400. Knowledge base processing program 205 then checks 405 and corrects the spelling of the words in the knowledge base 245 by using spell check module 215. Then, knowledge base processing program 205 removes 410 common words from the knowledge base 245, such as "a", "an", and "the", by using stopword module 220. After this, knowledge base processing program 205 performs stemming 415 on the words in the knowledge base 245. Steps 405, 410, and 415 are optional. They increase the value of the knowledge base by standardizing the data within it.

In step 420, knowledge base processing program 205 groups 420 words of similar and related meanings together into notional families. Notional families serve to cluster data and reduce data dimensionality in order to find the most relevant implications. In other words, notional families identify a consensus in the knowledge base, and this consensus serves as the reasoning apparatus' common sense. Notional families were first proposed in "The automatic derivation of information retrieval encodement from machine readable text" by H. P. Luhn, Information Retrieval and Machine Translation, 3(2), pp. 1021-1028, 1961, which is hereby incorporated by reference.

One way to cluster data and reduce data dimensionality in order to find the most relevant implications is to perform latent semantic analysis on the implications in the knowledge base. Latent semantic analysis is a statistical method that indexes phrases or documents to reflect topic similarity. Topic similarity is based on word co-occurrence, a valid indicator of topic relatedness. In latent semantic space, phrases can have high similarity even if they do not share any terms, so long as their terms are semantically similar according to the co-occurrence analysis. In other words, latent semantic analysis addresses the synonymy problem of people using different words to refer to the same concept. Latent semantic analysis results in a unique consequent statement for each antecedent statement and vice versa.

Here, latent semantic analysis indexes implications leading to each consequent and then applies these indices via singular value decomposition to find the most relevant implications. The time needed to perform singular value decomposition is exponential based on the rank of the statement by implication matrix and the number of singular values that are computed. Latent semantic analysis is described further in "Indexing by Latent Semantic Analysis" by S. C. Deerwester, S. T. Dumais, T. K. Landauer, G. W. Furnas, and R. A. Harshman, Journal of the American Society of Information Science, 41(6), pp. 391-407, 1990; and "Foundations of Statistical Natural Language Processing" by C. D. Manning and H. Schuetze, Chapter: Topics in Information Retrieval: Latent Semantic Indexing, 2001; both of which are hereby incorporated by reference.

Other techniques to cluster data and reduce data dimensionality in order to find the most relevant implications include the statistical methods of spectral clustering and principal component analysis. Spectral clustering methods cluster points using eigenvectors of matrices derived from that data. The basic idea of principal component analysis is to determine the components $s_1, s_2, \ldots, s_n$ that explain the maximum amount of variance possible by n linearly transformed components. Spectral clustering is described further in "A Comparison of Spectral Clustering Algorithms" by D. Verma and M. Meila, University of Washington (UW) Computer Science and Engineering (CSE) Technical Report, Mar. 5, 2001; and "On Clusterings—Good, Bad, and Spectral" by R. Kannan, S. Vempala, and A. Veta, $41^{st}$ Annual Symposium on Foundations of Computer Science, Nov. 12-14, 2000, Redondo Beach, Calif.; both of which are hereby incorporated by reference. Principal component analysis is described further in Principal Component Analysis by I. T. Jolliffe, Springer-Verlag, 1986, which is hereby incorporated by reference.

In step 425, knowledge base processing program 205 compiles 425 the knowledge base using WordNet module 235. WordNet®, from Princeton University, is a lexical database for the English language. Nouns, verbs, adjectives, and adverbs are organized into synonym sets. Each set represents one underlying lexical concept (the "root word"), and different relations link the sets.

Each root word is a hypernym of the related synonyms. Hypernymy is a linguistic term for an is-a relationship. For example, since a fork is silverware, "silverware" is a hypernym of "fork." One example of WordNet synonym sets involves the root word "can" (as a noun). A first hypernym would be "tin can," a second hypernym would be "toilet," and a third hypernym would be "bathroom." Synonyms in the "tin can" group would include "milk can" and "oil can," while synonyms in the "bathroom" group would include "restroom" and "washroom."

WordNet module 235 generalizes knowledge in the knowledge base 245 by replacing synonyms with their hypernyms. WordNet module 235 then compacts the knowledge base by associating implications with hypernyms rather than with synonyms. Then, when a synonym is encountered, the hypernym can be determined and the hypernym's implications can be used. For example, if the knowledge base does not have any implications about "fork," it can use implications about "silverware." Without the WordNet synonym sets, a "fork" antecedent would not match any implications, and no consequent would be determined. The Word-Net synonym sets also save memory by storing each implication once (at the hypernym level), rather than storing each implication multiple times (at the synonym level). Also, better reasoning results can be obtained by first pruning irrelevant hypernyms from the WordNet synonym sets based on the real-world context.

If the synonyms co-occurred in the knowledge base, then they would have already been clustered together by latent semantic analysis or a similar technique. WordNet has the added benefit of clustering synonyms together even if they do not occur in the knowledge base. An alternative is to assemble a list of synonyms for a term and then use the synonyms as part of the feature vector for latent semantic analysis. Step 425 is optional, but compiling the knowledge base enables more implications to be used, saves storage space, and increases the speed of the reasoning process.

After knowledge base processing program 205 has compiled 425 the knowledge base 245 using WordNet module 235, knowledge base processing program 205 ends 430. This also ends the processing of the knowledge base 245 (step 310 in FIG. 3).

At this point, the knowledge base is self-consistent. It is preferably completely self-consistent, but in one embodiment, it is substantially self-consistent. In addition, there is a unique implication leading to each consequent, which means that there is a unique antecedent for each consequent. The next step is to actually use the reasoning apparatus 100. A person submits a command to the reasoning apparatus 100, and main program 200 receives 315 the command.

Reasoning apparatus 100 can process a command even if the command contains a word that is not in the knowledge base. For example, one query is "Where might I find a carafe?" The knowledge base has the following two pieces of information: 1) Bottles and refrigerators are found together; and 2) Refrigerators are found in the kitchen. First, main program 200 uses WordNet module 235 to prune out irrelevant senses of "bottle" in the context of an indoor environment. From the remaining senses, main program 200 determines that "bottle" is a hypernym for "carafe." Since "bottle" is a hypernym for "carafe," knowledge about bottles also applies to carafes. Thus, carafes and refrigerators are found together. Since refrigerators are found in the kitchen, so are carafes.

After main program 200 has received 315 the command, it performs 320 the task specified by the command. After main program 200 has performed 320 the task, it ends 325.

Reasoning apparatus 100 can be used in many different contexts. The discussion below focuses on using reasoning apparatus 100 in conjunction with a mobile robot in an indoor home or office environment. However, reasoning apparatus 100 could also be used without a robot and in environments other than a home or office. Reasoning apparatus 100 can also be used to perform many different types of tasks. One task is to answer a query. In one situation, reasoning apparatus 100 may be able to answer the query using information already in the knowledge base. In another situation, answering a query may also require inferencing based on that information.

2.1 Sample Task: Goal Achievement

Another task is to determine a course of action that is designed to achieve a particular goal. This goal can be directly input by a user, or its desirability can be deduced by the reasoning apparatus 100 based on the knowledge base and inferencing. Once the goal is known, reasoning apparatus 100 can determine a course of action to perform in order to achieve the goal. The course of action would be determined by backward chaining implications starting at the goal situation.

In this embodiment, the variable D denotes the set of all statements that are explicitly desired. The variable D* denotes the set of all statements that are desired, either explicitly or by implication. D* is given by the recursive definition $$D^* = D \cup \{\phi : \phi' \rightarrow_A \phi \in I \wedge \phi' \in S^*\}$$

D* is a function of time because the states of objects can change and new knowledge can be inserted into the knowledge base 245. The variable C denotes the set of all statements that are capable of being directly accomplished by the robot. The variable C* denotes the set of all statements that are capable of being accomplished by the robot, either directly or indirectly (i.e., by implication). C* is given by the recursive definition $$C^* = C \cup \{\phi : \phi' \rightarrow \phi \in F \wedge \phi' \in C^*\}$$

C* is a function of time because the states of objects can change and new knowledge can be inserted into the knowledge base 245.

For example, assume that reasoning apparatus 100 is used in conjunction with a robot. The first step is for reasoning apparatus 100 to determine a goal. The robot touches a soda can and senses that it is warm. Main program 200 then performs inferencing over "(soda-can, warm)" using inferencing program 210. Inferencing program 210 checks whether "(soda-can, warm)" is the antecedent of any desires implications. If there is more than one matching desires implication, inferencing program 210 chooses the implication with the closest meaning (based on latent semantic analysis or a similar technique). Eventually, inferencing program 210 chooses the implication $$\phi_1 \rightarrow_A \phi_2 \text{ where } \phi_1 = \text{(soda-can, warm) and } \phi_2 = \text{(soda-can, chilled)}$$

Since this is a desires implication, the consequent is the goal. Thus, inferencing program 210 has just determined the goal "(soda-can, chilled)" without any user input.

The next step is for reasoning apparatus 100 to determine a course of action to perform in order to achieve the goal. Main program 200 performs inferencing over the goal using inferencing program 210. This time, however, inferencing program 210 checks whether "(soda-can, chilled)" is the consequent of any causes implications.

In one embodiment, inferencing program 210 uses the following action-selection algorithm. The algorithm uses state knowledge and common sense to determine a list of actions to take. Given the implications (I and F), the current state (S and D) and the capabilities of the robot (C), the following algorithm computes the actions that the robot should take:

```
GETACTIONS(I, F, S, D, C)
    A ← 0
    Q ← S
    R ← D
```

-continued

```
while Q ≠ <>
    do φ ← Q.pop_front
        R ← R ∪ {φ' : φ →_d φ' ∈ I}
        Q.push_back(<φ' : φ → φ' ∈ F>)
    for each φ_d in R
        do Q ← <φ : φ → φ_d ∈ F>
            while Q ≠ <>
                do φ ← Q.pop_front
                    if φ ∈ C
                        then A ← A ∪ {φ}
                        Q.push_back(<φ' : φ' → φ ∈ F>)
return A
```

Note that this exact algorithm is not required. The same inferencing can be performed using, for example, a theorem prover or general purpose inferencing engine like SNARK™ (SRI's New Automated Reasoning Kit) from SRI International.

Eventually, inferencing program 210 finds the implication $\phi_1 \rightarrow \phi_2$ where $\phi_1$=(soda-can, refrigerated) and $\phi_2$= (soda-can, chilled)

Since this is a causes implication, the course of action to achieve the goal is the antecedent. Thus, inferencing program 210 has just determined the necessary course of action. Note that the inferencing necessary to determine the goal and the inferencing necessary to determine the course of action required only one step. Inferencing program 210 can also determine goals and courses of action where more than one inferencing step is necessary.

Once the course of action has been determined, the reasoning apparatus 100 can proceed to carry out those actions in order to achieve the goal (e.g., if the reasoning apparatus 100 were used in conjunction with a robot). Reasoning apparatus 100 directs the robot to perform these actions, the actions are performed, and the goal is achieved. In this embodiment, the knowledge base 245 would also contain information about objects themselves (the Objects relation) and how various objects are used (the Uses relation). The robot would use this information to determine how to accomplish various tasks. The knowledge base 245 might also contain information about in what types of rooms particular objects are usually found (the Locations relation) and which objects are usually found together (the Proximity relation). The robot would use this information to determine where to find a particular object that it needs to perform a task. Each of these relations was discussed above with reference to a possible database implementation.

2.2 Sample Task: Location Determination

Reasoning apparatus 100 can also use its observations of the environment and its common sense knowledge about objects and locations to determine its own location. Location determination is helpful when, for example, reasoning apparatus 100 is used in conjunction with a mobile robot. A related task is to label rooms and open areas in a home or office given 1) a two-dimensional map, 2) location knowledge, and 3) simulated objects and room labels. In order for the robot and people to have natural interactions, it is helpful for the robot to possess knowledge of the surrounding space, such as a layout of rooms. Map structure can be generated using common sense constraints such as 1) an office is owned by an individual; 2) a gallery and a walkway are not owned by an individual; and 3) a reception area is located at an entrance to an office.

Map layout information, such as labels of objects and rooms, can then be incorporated into sentences and modified map layouts to reflect sentential information. This is further discussed in "Reasoning with Analogical Representations" by K. Myers and K. Konolige, in Principles of Knowledge Representation and Reasoning: Proceedings of the Third International Conference (KR92) (B. Nebel, C. Rich, and W. Swartout, eds.), San Mateo, Calif., 1992, which is hereby incorporated by reference. Note that a map does not have to be human-generated; it can also be generated by laser data. Laser data can also be extracted from cameras to build a sparse map of the unknown environment.

Figure 5:
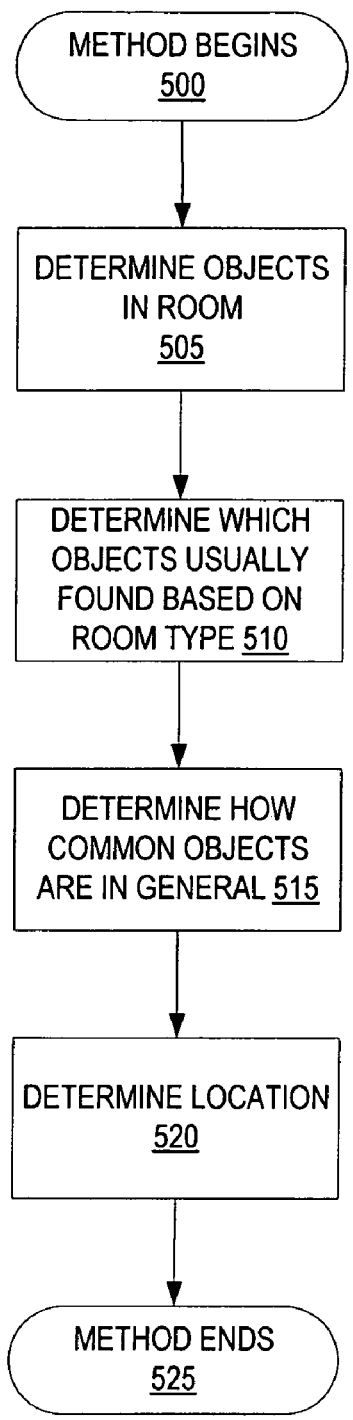
FIG. 5 illustrates a method for determining a location using Bayesian inferencing.

FIG. 5 illustrates a method for determining a location using Bayesian inferencing. For example, a robot is located in one room (a)) of a set of rooms (ω): ω∈Ω. Reasoning apparatus 100 determines the type of the room based on 1) which objects are probably present in the room, 2) which of these objects is usually found in each type of room, and 3) how common these objects are in general. When these probabilities are used with Bayes' theorem, the type of room with the highest probability can be calculated.

After the method begins 500, reasoning apparatus 100 determines 505 which objects are in the room. The robot collects knowledge (D) about objects in the room using one or more methods. These methods include, for example, direct user input (e.g., by typing in "This room contains a bed") or speech recognition (e.g., by hearing a person say "This room contains a bed" and then processing the speech). Ideally, a mobile robot should be able to associate human terms with sensory data by receiving a running description of its immediate surroundings as it explores a new home or office. These human-provided labels could be room types (e.g., "This is a kitchen") or objects ("This is a chair"). Another possibility is for reasoning apparatus 100 to use object recognition (e.g., by taking a picture of the room and then processing the picture).

Based on this knowledge, the robot determines whether certain objects (x) are present in the room. If the robot's knowledge were perfect, then it would know with 100% certainty which objects were present. However, each of the methods discussed above has a different inherent confidence value (level of certainty). While direct user input might have close to 100% certainty, speech recognition probably has less certainty, perhaps only 91%. This means that if speech recognition determines that there is a bed in the room, the probability that there is actually a bed in the room might be 91%. Since the level of certainty differs based on the method used, the probability that particular objects have been observed is the conditional probability distribution $P(x_i|D)$ over the objects $x_i \in X$.

Next, reasoning apparatus 100 determines 510 which of these objects is usually found in each type of room. This is represented symbolically as $P(x_i|\omega)$. One way to calculate this value is to count the number of entries in the knowledge base wherein a particular object $x_i$ is mentioned as being in a particular room ω and then divide by the number of entries of wherein any object x is mentioned as being in that particular room ω. This can be represented symbolically as $P(x_i|\omega) = C(x_i, \omega)/C(\omega)$, where $x_i$ is a particular object and ω is a particular room Reasoning apparatus 100 then determines 515 how common these objects are in general. This is represented symbolically as $P(x_i)$. One way to calculate this value is to count the number of entries in the knowledge base wherein a particular object $x_i$ is mentioned and then divide by the total number of entries in the knowledge base.

Lastly, reasoning apparatus 100 determines 520 the location of the robot. The room in which the robot is located is given by $$\omega' = \underset{\omega \in \Omega}{\operatorname{argmax}} P(\omega \mid D)$$

$$= \underset{\omega \in \Omega}{\operatorname{argmax}} \sum_x P(\omega, x \mid D)$$

$$= \underset{\omega \in \Omega}{\operatorname{argmax}} \sum_x \frac{P(\omega)P(x \mid \omega)P(x \mid D)}{P(x)}$$

$$= \underset{\omega \in \Omega}{\operatorname{argmax}} P(\omega) \sum_{x_1} \frac{P(x_1 \mid \omega)P(x_1 \mid D)}{P(x_1)} \cdots \sum_{x_n} \frac{P(x_n \mid \omega)P(x_n \mid D)}{P(x_n)}$$

$$= \underset{\omega \in \Omega}{\operatorname{argmax}} \ln P(\omega) + \sum_{i=1}^n \ln \sum_{x_i} \frac{P(x_i \mid \omega)P(x_i \mid D)}{P(x_i)}$$

Vector x indicates the presence or absence of the objects. Each object $x_i$ is associated with an index i. If the value of x at index i is 1, then object $x_i$ is present; if the value is 0, then object $x_i$ is not present. Since x contains only binary values, the computational complexity is linear in the number of possible objects. In order to calculate the above value, we assume a generative Bayesian model where ω influences x and x influences D and calculate the joint distribution $$P(\omega, x, D) = P(\omega)P(x \mid \omega)P(D \mid x)$$

$$= \frac{P(\omega)P(x \mid \omega)P(x \mid D)P(D)}{P(x)}$$

Although the invention has been described in considerable detail with reference to certain embodiments thereof, other embodiments are possible as will be understood to those skilled in the art.

What is claimed is:

1. A method for processing a knowledge base, the knowledge base comprising a plurality of statements and a plurality of rules, a rule linking two statements, the method comprising:
    grouping words of related meanings comprise one of latent semantic analysis, spectral clustering, and principal component analysis; and
    determining a set of relevant rules.

2. The method of claim 1, further comprising the step of: generalizing the knowledge base by replacing a statement associated with a first object with a statement associated with a second object, the second object being a hypernym of the first object.

3. The method of claim 1, further comprising the step of: inferencing using the knowledge base.

4. The method of claim 3 wherein inferencing using the knowledge base comprises the step of:
    inferencing using an object not present in the knowledge base.

5. The method of claim 4 wherein the object not present in the knowledge base is one of a hypernym and a synonym of an object that is present in the knowledge base.

6. The method of claim 3, further comprising the step of one of answering a query, determining how to perform a task, and determining how to fulfill a desire.

7. The method of claim 3, further comprising the step of one of determining consensus knowledge and determining common sense knowledge.

8. The method of claim 3, further comprising the step of determining a location of a robot.

9. The method of claim 1, further comprising the step of:
    correcting a spelling of a word in the knowledge base, responsive to a determination that the spelling is incorrect.

10. The method of claim 1, further comprising the step of:
    removing a word, responsive to a determination that the word is on a list of stopwords.

11. The method of claim 1, further comprising the step of:
    replacing a word with a root form of the word, responsive to a determination that the word is not in root form.

12. An apparatus for processing a knowledge base, the knowledge base comprising a plurality of statements and a plurality of rules, a rule linking two statements, the apparatus comprising:
    a grouping module, configured to group words of related meanings comprise one of latent semantic analysis, spectral clustering, and principal component analysis; and
    a relevancy module, configured to determine a set of relevant rules.

13. The apparatus of claim 12, further comprising:
    a generalization module, configured to generalize the knowledge base by replacing a statement associated with a first object with a statement associated with a second object, the second object being a hypernym of the first object.

14. The apparatus of claim 12, further comprising:
    an inference module, configured to inference using the knowledge base.

15. The apparatus of claim 14 wherein inferencing using the knowledge base comprises:
    inferencing using an object not present in the knowledge base.

16. The apparatus of claim 15 wherein the object not present in the knowledge base is one of a hypernym and a synonym of an object that is present in the knowledge base.

17. The apparatus of claim 14, further comprising one of answering a query, determining how to perform a task, and determining how to fulfill a desire.

18. The apparatus of claim 14, further comprising one of determining consensus knowledge and determining common sense knowledge.

19. The apparatus of claim 14, further comprising determining a location of a robot.

20. The apparatus of claim 12, further comprising:
    correcting a spelling of a word in the knowledge base, responsive to a determination that the spelling is incorrect.

21. The apparatus of claim 12, further comprising:
    removing a word, responsive to a determination that the word is on a list of stopwords.

22. The apparatus of claim 12, further comprising:
    replacing a word with a root form of the word, responsive to a determination that the word is not in root form.

23. An apparatus for processing a knowledge base, the knowledge base comprising a plurality of statements and a plurality of rules, a rule linking two statements, the apparatus comprising:
    means for grouping words of related meanings comprise one of latent semantic analysis, spectral clustering, and principal component analysis; and
    means for determining a set of relevant rules.

24. The apparatus of claim 23, further comprising:
   means for generalizing the knowledge base by replacing a statement associated with a first object with a statement associated with a second object, the second object being a hypernym of the first object.

25. The apparatus of claim 23, further comprising: means for inferencing using the knowledge base.

26. The apparatus of claim 25 wherein inferencing using the knowledge base comprises:
   inferencing using an object not present in the knowledge base.

27. The apparatus of claim 26 wherein the object not present in the knowledge base is one of a hypernym and a synonym of an object that is present in the knowledge base.

28. The apparatus of claim 25, further comprising one of means for answering a query, means for determining how to perform a task, and means for determining how to fulfill a desire.

29. The apparatus of claim 25, further comprising one of means for determining consensus knowledge and means for determining common sense knowledge.

30. The apparatus of claim 25, further comprising means for determining a location of a robot.

31. The apparatus of claim 23, further comprising:
   means for correcting a spelling of a word in the knowledge base, responsive to a determination that the spelling is incorrect.

32. The apparatus of claim 23, further comprising:
   means for removing a word, responsive to a determination that the word is on a list of stopwords.

33. The apparatus of claim 23, further comprising:
   means for replacing a word with a root form of the word, responsive to a determination that the word is not in root form.

* * * * *

UNITED STATES PATENT AND TRADEMARK OFFICE
CERTIFICATE OF CORRECTION

PATENT NO.         : 7,299,110 B2  
APPLICATION NO. : 10/752880  
DATED                  : November 20, 2007  
INVENTOR(S)       : Rakesh Gupta et al.

Page 1 of 1

It is certified that error appears in the above-identified patent and that said Letters Patent is hereby corrected as shown below:

Column 13, line 46, please delete "comprise" and insert --using--.

Column 14, line 21, please delete "comprise" and insert --using--.

Column 14, line 64, please delete "comprise" and insert --using--.

Signed and Sealed this

First Day of April, 2008

JON W. DUDAS  
*Director of the United States Patent and Trademark Office*